Sept. 7, 1965 TOMOKICHI TANGO ETAL 3,205,430

THREE-PHASE LINE VOLTAGE REGULATOR

Filed Sept. 27, 1961

INVENTORS
Tomokichi Tango
Hiroshi Kobayashi
Takeshi Anayama
Eijiro Miyazawa

By, Wendroth, Lind and Ponack, attorneys

United States Patent Office 3,205,430
Patented Sept. 7, 1965

3,205,430
THREE-PHASE LINE VOLTAGE REGULATOR
Tomokichi Tango, Fujisawa, Hiroshi Kobayashi, Kawasaki, Takeshi Anayama, Sendai, and Eijiro Miyazawa, Mitaka, Tokyo, Japan, assignors, by direct and mesne assignments, to Yawata Iron & Steel Co., Ltd., Tokyo, Japan, a corporation of Japan
Filed Sept. 27, 1961, Ser. No. 141,085
Claims priority, application Japan, Oct. 4, 1960, 35/49,459
3 Claims. (Cl. 323—76)

This invention relates to a three-phase line voltage regulator.

In a known conventional three-phase ferro-resonance type line voltage regulating system, for example, as shown in FIGURE 1, three sets of single phase ferro-resonance type line voltage regulating circuits are inserted respectively between lines R and S, between lines S and T and between lines T and R, where R, S and T are the input terminals for the three-phase voltage, the output voltage of each single-phase ferro-resonance circuit is supplied to the primary winding of a transformer $T_R$, $T_S$ or $T_T$, the secondary winding of said transformer is delta-connected to absorb unfavorable third harmonic current in the delta-connection so that the wave distortion of the output three-phase voltage may be reduced. In FIGURE 1, $L_R$, $L_S$ and $L_T$ are linear reactors with mutual induction windings between the lines R and S, between the lines S and T and between the lines T and R, respectively. The tank circuit consisting of $SR_1$ and $C_1$ is a resonance circuit which is resonant at a fundamental frequency so as to keep the voltage supplied to transformer $T_R$ practically constant due to the change in degree of saturation of the reactor $SR_1$ in accordance with the variation of the voltage between R and S, and hence by causing a leading or lagging current to flow in said linear reactor $L_R$. Tank circuits consisting of $SR_2$ and $C_2$ make up the same type of adjusting circuit for between the lines S and T, and tank circuit $SR_3$ and $C_3$ is the adjusting circuit for between the lines T and R.

According to the system shown in FIGURE 1, the distortion in output voltage supplied to transformers $T_R$, $T_S$ or $T_T$ caused by the third harmonic currents generated in the saturation reactors $SR_1$, $SR_2$ and $SR_3$ do not appear on the load side L, as the secondary windings of the transformer are delta-connected and are shorted for the third harmonics. Therefore, the wave form of the output voltage supplied to the load is favorable. However, in the transformer, even at no load, the third harmonic currents flow in the delta-connected secondary windings and therefore the third harmonic currents flow through the primary windings in a quantity of the same ampere turns. Therefore, unless the transformer is designed so as to have a capacity considerably larger than the output capacity, the temperature rise will be so great that the transformer will burn. Further, in the system shown in FIGURE 1, saturation reactors $SR_1$, $SR_2$ and $SR_3$ are wound individually on separate magnetic cores and separate transformers $T_R$, $T_S$ and $T_T$ are also used. Therefore, the number of component parts of the device are so many as to cause the manufacturing cost to be high.

The present invention has eliminated the above mentioned defects.

A principal object of the present invention is to provide a three-phase ferro-resonance type line voltage regulator wherein a three-phase saturation reactor is formed as a single unit by winding each phase winding on a respective leg of a three leg magnetic core, so that each phase winding operates as $SR_1$, $SR_2$ or $SR_3$, and one end of each said winding is Y-connected with the other windings so that the third harmonic currents can not be generated, as will be shown hereinafter.

Thus, without using transformers $T_R$, $T_S$ and $T_T$ as in the conventional device, unfavorable third harmonic currents ar substantially completely eliminated, and by avoiding the use of three separate saturation reactors, a three-phase voltage regulator having a simple construction can be made.

The cost of the apparatus can thereby be reduced, the efficiency can be increased and the output voltage wave form can be improved.

Other objects of the present invention will be made clear by the following explanation and the accompanying drawings.

Figure 1:
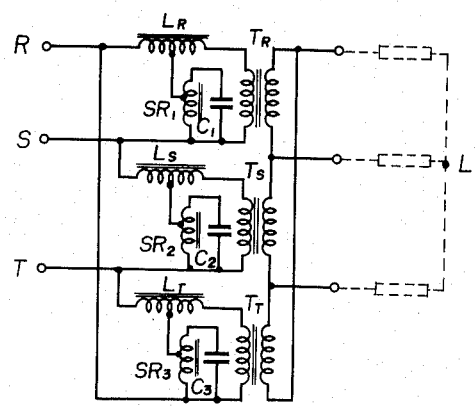
FIGURE 1 is a circuit diagram of a conventional system.
Figure 2:
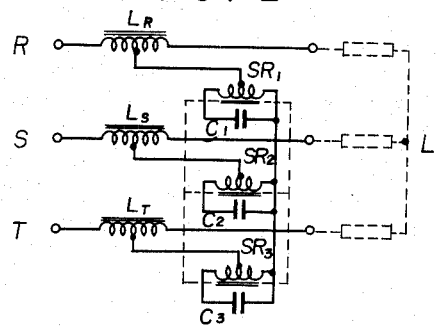
FIGURE 2 is a circuit diagram of an embodiment of the present invention.

In FIGURE 2, $L_R$, $L_S$ and $L_T$ are linear reactors with mutual induction windings for the R, S and T phases, respectively. $SR_1$, $SR_2$ and $SR_3$ are saturation reactors for the R, S and T phases, respectively. As indicated by the dotted lines in the drawing, the windings of the saturation reactors re respectively wound on three legs of a three leg magnetic core. $C_1$, $C_2$ and $C_3$ are resonance condensers cooperating with reactors $SR_1$, $SR_2$ and $SR_3$, respectively, which are resonant at a fundamental frequency.

Figure 3:
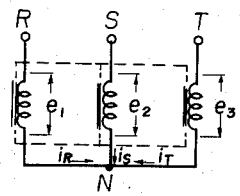
FIGURE 3 is a circuit diagram for elucidating the operating principle of the embodiment.

In FIGURE 3 are illustrated diagrammatically the Y-connected side of windings of each saturation reactor in the three-phase three leg saturation reactor which is the most important part in the present invention. If the voltages impressed on the above mentioned Y-connected side of windings are $e_1$, $e_2$ and $e_3$, respectively, and the number of turns N of said Y-connected side of windings are equal, we get, according to Faraday's law, $$\left.\begin{aligned} N\frac{d\phi_1}{dt}&=e_1 \\ N\frac{d\phi_2}{dt}&=e_2 \\ N\frac{d\phi_3}{dt}&=e_3 \end{aligned}\right\} \quad (1)$$

wherein $\phi_1$, $\phi_2$ and $\phi_3$ are magnetic fluxes at any instant in the three legs respectively.

Now the algebraic sum of the magnetic fluxes in said three legs must be always zero as there is no return magnetic circuit for said sum of the magnetic fluxes. Therefore, the condition $$\phi_1+\phi_2+\phi_3=-\int_0^t(e_1+e_2+e_3)=0 \quad (2)$$

must be established at any instant of $t$. Hence we get $$e_1+e_2+e_3=0 \quad (3)$$

From this relation we can deduce the next relations easily, $$\left.\begin{aligned} e_1&=e_R \\ e_2&=e_S \\ e_3&=e_T \end{aligned}\right\} \quad (4)$$

where $e_R$, $e_S$ and $e_T$ are phase voltage of the source of the three-phase voltage, having no zero phase component, respectively. This means that the potential of the Y-connected point of the three-phase saturation reactor is just equal to that of the neutral point of the three-phase source voltage, and that each phase of the three-phase saturation reactor can be treated in considering its function as if it were in isolated single phase saturation reactor, when an explanation for the constancy of the output voltage is required. Hence each phase voltage $e_1$, $e_2$ and $e_3$ is kept at the constant voltage as desired, independent of the variations of the source voltage and of the unbalance of the load current in the three-phases, as is the case with single-phase ferro-resonance voltage regulator.

This demonstrates that the output voltage in the present invention is constant.

Furthermore, when the wave form of the output voltage in the present invention is considered, currents $i_R$, $i_S$ and $i_T$ of the respective phases which are Y-connected as shown in FIG. 3 are such that $$i_R + i_S + i_T = 0 \qquad (5)$$

must be always established by Kirchhoff's law. Moreover, since the third harmonic and multiples of third harmonics in $i_R$, $i_S$ and $i_T$ are in the same phase, they must be zero in order that the above Equation 5 hold true. Generally, in a saturation reactor the higher harmonic components of the current wave form are only odd harmonics since the magnetization characteristics of the magnetic core are symmetrical with respect to the origin. The amplitude of harmonics higher than the third harmonics decreases extremely when the curve of magnetization characteristics of the magnetic core differs from and is rounded in form as compared with the ideal square characteristic curve. Therefore, in the present invention, the third harmonic currents and multiples of third harmonic currents are substantially completely eliminated by the Y-connection of the saturation reactors, as shown above, and the remaining higher harmonic currents, which are essentially quite small in quantity, can be reduced to a great extent by using a magnetic core which has magnetization characteristic curve which is rounded rather than rectangular in form for a saturation reaction. Thus the currents in the saturation reactor of the present invention have a nearly sinusoidal wave form. As the voltage drops within the linear reactors due to these currents must be substantially sinusoidal, the output voltage also becomes nearly sinusoidal.

Further, in the embodiment in FIGURE 2, as stated formerly, the phase voltages $e_1$, $e_2$ and $e_3$ are regulated to the same designed value, independent of the variation of the source voltage and of the unbalannce of the load current, and the conditions of Formula 4 must always be present, and the phase differences between $e_1$, $e_2$ and $e_3$ must be 120°. Hence, the output voltage must be normal three-phase voltage constant in magnitude and in phase, even with an unbalance of the source voltage and the load (which may be a single-phase in the extreme case).

What we claim is:

1. A ferro-resonance type three-phase line voltage regulator, comprising three linear reactors adapted to be inserted between three input terminals of a three-phase alternating current source and three load terminals respectively, a tap on each of the windings of said linear reactors intermediate the ends of the respective reactor on which the tap is located, a three-leg magnetic core, three saturation reactance windings one on each leg of said three-leg magnetic core, and three condensers, the three windings of said saturation reactors connected in parallel with the three condensers respectively with each reactor and condenser together forming a ferro-resonance tank circuit, the respective one ends of the tank circuits being Y-connected and the other ends being connected to said taps on the windings of the linear reactors respectively, whereby the output voltage at the load terminals is kept constant.

2. A ferro-resonance type line voltage regulator as claimed in claim 1 wherein the saturation characteristics of said three-leg magnetic core are such that the magnetic fluxes in the magnetic core make the wave form of the current in the ferro-resonance tank circuit substantially sinusoidal.

3. A ferro-resonance type line voltage regulator as claimed in claim 1, wherein the inductance of each leg of the three-leg type magnetic core and the capacity of the condenser connected in parallel with said inductance are such that they resonate with the fundamental wave of the alternating current source.

References Cited by the Examiner

UNITED STATES PATENTS 2,967,271  1/61  Kohn _____ 323—60

LLOYD McCOLLUM, *Primary Examiner.*

ROBERT C. SIMS, *Examiner.*